United States Patent [19]

Bachmann et al.

[11] 4,093,391
[45] June 6, 1978

[54] MILLING CUTTER HEAD FOR MAKING ARCUATE TOOTHING

[75] Inventors: Lothar Willy Bachmann; Eberhardt Karl Reise, both of Karl-Marx-Stadt, Germany

[73] Assignee: VEB Werkzeugkombinat Schmalkalden, Schmalkalden, Germany

[21] Appl. No.: 665,059

[22] Filed: Mar. 8, 1976

[51] Int. Cl.² .............................................. B26D 1/12
[52] U.S. Cl. .................................................... 407/22
[58] Field of Search ............. 29/103 C, 103 B, 105 A, 29/105 R

[56] References Cited

U.S. PATENT DOCUMENTS

| | | | |
|---|---|---|---|
| 2,033,384 | 3/1936 | Marshall | 29/105 A |
| 2,974,399 | 3/1961 | King et al. | 29/105 A |
| 3,571,876 | 3/1971 | Blakesley | 407/22 |
| 3,760,476 | 9/1973 | Kotthaus | 29/105 A |

*Primary Examiner*—Leonidas Vlachos
*Attorney, Agent, or Firm*—Tab T. Thein

[57] ABSTRACT

Milling cutter head for making arcuate toothing, comprising a substantially disk-shaped carrier body that is surrounded by a locking ring, the body having therein one or more pairs of grooves of a stepped cross-section, for receiving a corresponding number of pairs of removable, axial milling cutters, in each pair one being an inner and one an outer cutter. These cutters have head cutting and flank cutting edges, and optionally head and flank clearance surfaces. The head cutting edges are made of overlap partially; the cutting edges are formed at intersecting points between the clearance surfaces. Both kinds of cutters have cylindrical body surfaces that include chip bearing surfaces and associated limiting surfaces, as well as optional supporting surfaces. The inclination angle defined between the chip bearing and the limiting surfaces is smaller than 90°. The cutters are preferably rod-shaped and have quadrilateral cross-sections. The receiving grooves are preferably include supporting and locating surfaces for the cutters. The invention defines and recommends various critical and useful parameters, such as a tilt angle by which the supporting groove surfaces are displaced with respect to the milling-cutter axis, a radial angle by which the locating groove surfaces are offset with respect to a tangent to the trajectory of the cutting points of the head cutting or the flank cutting edges of the cutters, and other useful constructional parameters.

7 Claims, 9 Drawing Figures

MILLING CUTTER HEAD FOR MAKING ARCUATE TOOTHING

The invention relates to a milling cutter head for making arcuate toothing, having therein removable inner and outer milling cutters that form one or more pairs.

For producing bevel gears with arcuate toothing, face milling cutters are used with cutters inserted into a carrier body, the edges corresponding to the desired tooth profiles, and which cutters can be made in the form of inner or outer flank cutters. The milling tools are received in axial grooves of the body and secured therein by screws and the like. For radial adjustment of the edges to the desired cutter track circle, adjusting wedges are usually provided between the bottoms of the grooves and the tool shafts.

The tools usually have a quadrilateral shaft cross-section with an adjoining head portion, the latter being usually profiled in accordance with the edge form. The cutting edges are constituted by the cutting planes of two flank clearance surfaces and a head clearance surface. In order to maintain the useful cutting profile, the edges have to be re-sharpened at the chip bearing surface, noting of course that each sharpening removes some of the tool material so that that surface is displaced parallel with its previous outlines and transversally to the clamping shaft axis.

To allow such milling cutters to be sharpened as often as possible, the cutter head portions are made much wider than the clamping cross-section in the operating direction. This widening requires more room than is usually needed while it is not possible any more to accommodate a substantial number of the milling cutters, which is endeavored to increase production results.

The over-dimensioning in the re-sharpening direction necessitates the use of substantially more, rather expensive material. The repeated sharpening has the further disadvantage that the changes at the chip bearing surfaces require the gear cutting or other machines to be repeatedly re-adjusted, resulting in their poor exploitation, and usually in a reduced quality of the gears produced thereon.

To avoid these and other disadvantages one has already designed gear cutting milling heads where the cutters have rod shapes and a cross-section that is substantially uniform all along the cutter lengths. Both at the clamping and at the cutting portions these milling cutters have the same widths. In known arrangements using such cutters, usually three rod-shaped cutters are employed together, supplementing each other, namely in the respective roles of a rough cutter, an outer cutter and an inner cutter. The triple cutter set-up cooperates in making a single tooth or space between adjoining teeth. Special arrangements have to be provided for fixing the respective cutter portions in the head, which complicates the set-up, the adjustments and the milling operation itself.

The purpose of using the rod-shaped cutters in a milling group or unit was to apply a relatively large number of milling cutters within a small space so as to increase productivity.

In a further known arrangement, two cutters were used: the cutting edges were constituted by a chip bearing surface which is at an angle to the rod-shaped cutter axis, two flank clearance surfaces also inclined to the axis, and a head clearance surface transversal to the cutter axis.

These milling cutters can be resharpened on both the flank clearance surfaces and the cutting surface. The former are sharpened to the extent that the cutting surface is shifted along the cutter axis while maintaining the geometry of the cutter set-up.

The improved arrangement gave the possibility of applying a substantial number of cutters about the periphery of the head. Both the wear and the re-sharpening occur in the axial cutter direction so that subsequent readjustments are greatly simplified. It should be clear that much less valuable material is needed for these cutters since they are thinner and do not require portions thereof to have an excessive width or thickness.

It is however a drawback of these cutters that the provision of several cutters behind one another does not leave sufficient space for the removed chips, resulting in chip stalling and premature deterioration of the cutters themselves. It has been attempted to remedy this by applying a spacer plate in the peripheral direction between the cutters which in turn resulted in a greater space requirement of the entire cutter head. It can be seen that the grouped arrangement of two or more milling cutters has given only partial results.

The webs between the cutter receiving grooves have to be left sufficiently wide to withstand the encountered cutting forces during the milling operation. The gain in space that was accomplished with these known arrangements was consequently of a dubious value. The endeavored increased efficiency was only partly achieved in these known milling cutters.

Finally it should be mentioned that the technology of re-sharpening also met with serious difficulties. The procedure has proven to be difficult and time-consuming because sharpening had to be performed on at least two, possibly three surfaces while strict rules had to be observed in view of the trigonometric relationships between the cutting angles. It became unavoidable to use precision-type, expensive re-sharpening devices that are relatively difficult to handle properly, so that further time and material expenditures were encountered.

Re-sharpening, if performed on all four surfaces, results in a substantial volume of material being removed which further increases the expenditures.

It is therefore one of the objects of the present invention to eliminate the disadvantages and drawbacks encountered with hitherto known milling cutter heads and cutters therefor. The invention aims at increasing the efficiency of the cutters, reducing the specific consumption of the cutting material, simplifying the re-sharpening procedure, and decreasing the maintenance costs.

It is another object of the invention to provide a milling head in which several (or several pairs of) cutters can be accommodated, without impairing chip formation and removal, and which gives the earlier-explained advantages of a foolproof, less costly sharpening procedure.

In accordance with major features of the invention, this is accomplished in the novel milling cutter head by providing one or more pairs of removably insertable, substantially axial outer and inner milling cutters inserted in stepped receiving grooves of a carrier body which is surrounded by a locking ring. Both cutters have head as well as flank cutting edges, the latter partially overlapping between cutters of a pair, wherein the cutters have cylindrical body surfaces that are substantially rectilinear along the entire cutter lengths and in both spatial directions; these surfaces include active chip bearing surfaces and limiting surfaces, the latter adjoining the flank cutting edges.

In accordance with an important feature of the invention, the angle defined between the chip bearing and the limiting surfaces is smaller than 90°. The milling cutters are preferably rod-shaped and have quadrilateral cross-sections.

Another important feature is constituted in that the receiving grooves have are stepped in their cross-section. Appropriate supporting and locating surfaces may be included in the stepped configuration for the milling cutters.

The locating surfaces in the grooves are preferably offset with respect to a tangent to the trajectory of the cutting points of head cutting or flank cutting edges of the milling cutters by a specified radial clearance angle.

As to the supporting surfaces in the grooves, they are displaced with respect to the axis of the milling cutter head, in the operating direction thereof, by a specified tilt or inclination angle.

Other objects, features and many of the attendant advantages of the invention will be readily appreciated as the same becomes better understood by reference to the following detailed description, when considered with the accompanying drawings, wherein FIG. 1 shows a partial longitudinal section through the milling cutter head according to the invention, showing inserted inner and outer cutters;

Figure 1:
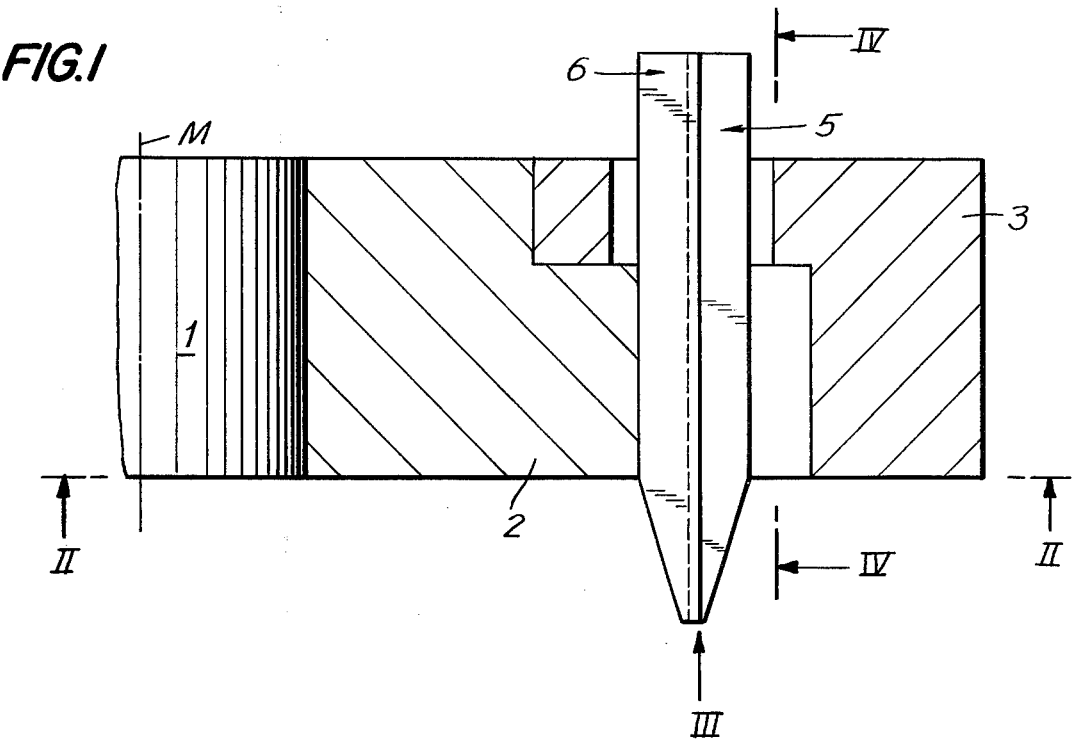

The inventive milling cutter head generally designated by numeral 1 comprises a disk-shaped carrier body 2 and a surrounding locking ring 3. In a peripheral surface of the body 2 there are receiving grooves 4 that run somewhat in an axial direction and that are preferably stepped in their cross-section, as can be seen. These grooves serve for holding therein removably insertable milling-cutter pairs 5, 6 of which the former is an outer cutter and the latter is an inner cutter.

Figure 2:
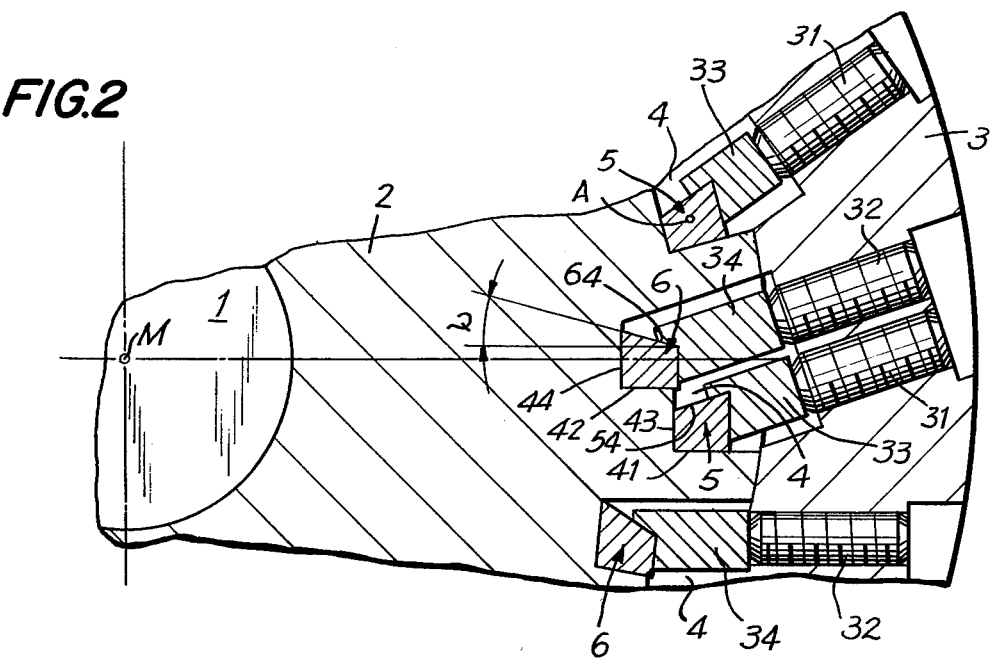
FIG. 2 is a partly sectional view along line II — II of FIG. 1, also showing the clamping of the cutters.
Figure 3:
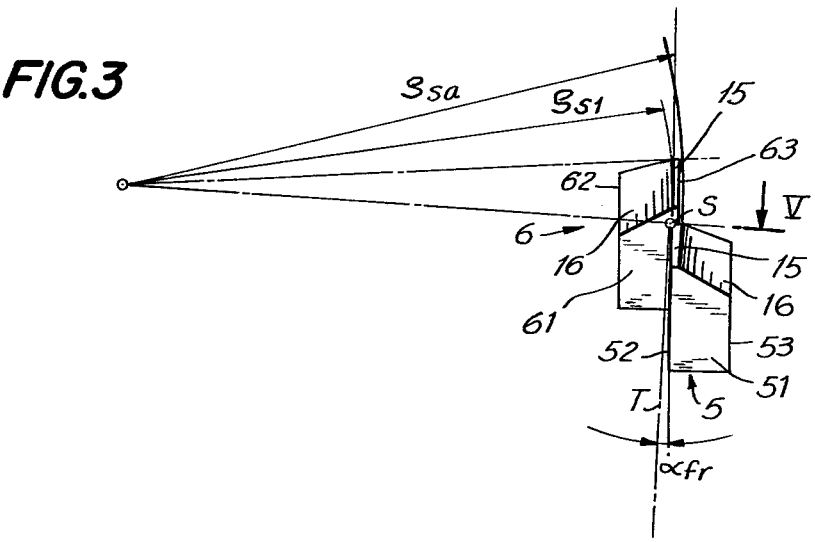
FIG. 3 is a detail view of the cutters, as seen in FIG. 1 in the direction of arrow III.
Figure 4:
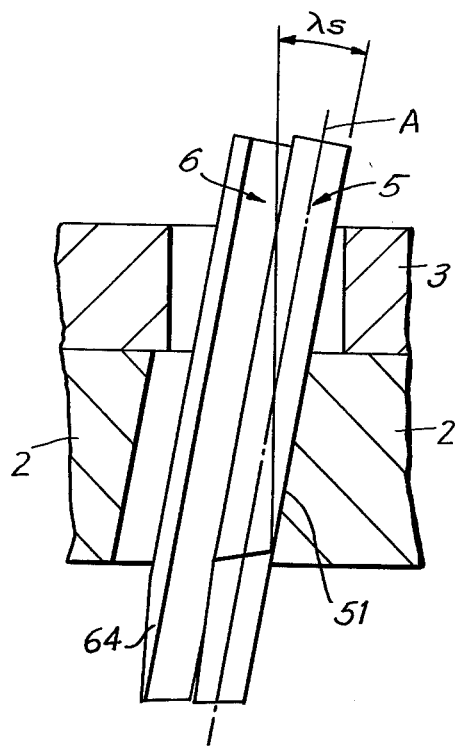
FIG. 4 is a lateral view onto the cutters, taken along line IV — IV of FIG. 1.
Figure 5:
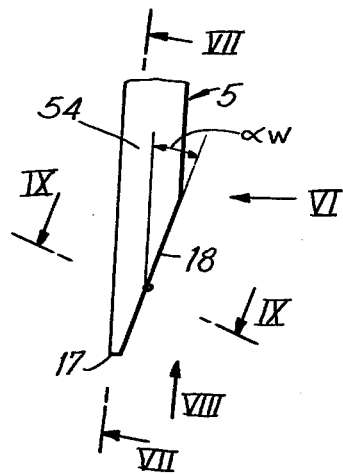
FIG. 5 is an end view of the outer cutter as seen in FIG. 3 in the direction of arrow V.

It can be seen in FIGS. 1, 2 and 4 that these cutters are disposed in pairs (one or more in a particular cutter head), constituting together active cutting profiles. In FIGS. 3 and 5 one can see head clearance surfaces 15, flank clearance surfaces 16, head cutting edges 17 as well as flank cutting edges 18, for both of the cutters 5, 6 (although FIGS. 5 to 9 concentrate on the outer cutter 5). It can be seen in FIGS. 1 and 3 that the edges 17 of the two cutters in a pair partially overlap.

The cutters 5, 6 are preferably made with a quadrilateral cross-section, with an elongated rod shape, so that all four cylindrical body surfaces of a cutter run substantially rectilinearly in both spatial directions along the entire cutter lengths.

The body surfaces of the cutters are constituted as follows: outer cutters 5 have a supporting surface 51, left- and right-hand limiting surfaces 52 and 53, and a chip bearing or cutting surface 54. Similarly, the inner cutters 6 have a supporting surface 61, left and right limiting surfaces 62 and 63, and a chip bearing surface 64.

The cylindrical body surfaces are consequently all parallel with a longitudinal axis A of each cutter 5, 6. Their chip bearing or cutting surfaces 54, 64, which are rectilinear in both spatial directions along these cutters, are tilted with respect to the neighboring limiting surfaces 53, 62 by an angle $\Psi$ as can be seen in FIGS. 2, 3.

The angle $\Psi$ is preferably less than 90° in accordance with one of the important features of the invention. The earlier-mentioned head and flank clearance surfaces 15, 16 have intersecting points where the head and flank cutting edges 17, 18 are formed.

The flank cutting edges 18 meet the limiting surfaces 52, 63, that run to the clearance surfaces 15, with a flank angle $\alpha_w$, the value of which depends on the flank angle of the workpiece to be machined and also on the requirements of the toothing to be produced.

Cutter geometry and relationships are shown in detail in FIGS. 3 through 9. It is preferred that the chip bearing surface 54 defines with a tool reference plane W a cutting angle $\gamma_n$ for the head cutting edge 17 while a similar flank cutting angle $\gamma_w$ for the flank cutting edge 18 is defined between the same surface 54 and the plane W.

The edge 17 has a head clearance angle $\alpha_{fn}$ assigned thereto while the edge 18 is associated with a flank clearance angle $\alpha_{fw}$.

Figure 6:
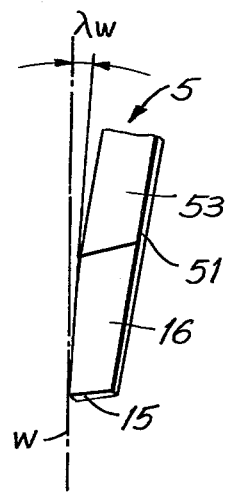
FIG. 6 is a side view taken in FIG. 5 from the direction of arrow VI.
Figure 7:
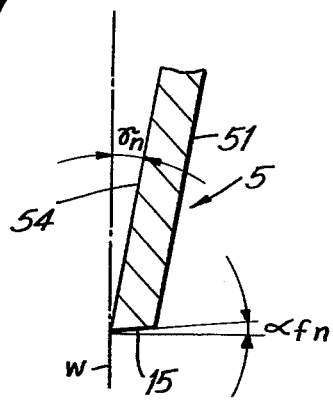
FIG. 7 is a longitudinal sectional view of the same outer cutter, taken along line VII — VII in FIG. 5.
Figure 8:
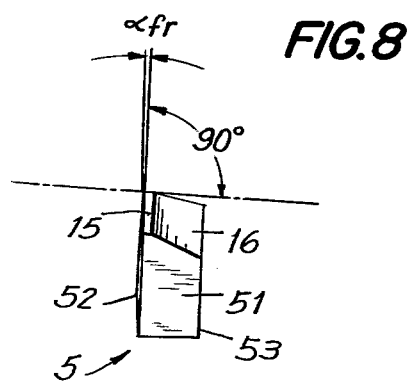
FIG. 8 is a view in the direction of arrow VIII in FIG. 5, at right angles to a head cutting edge of the cutter.
Figure 9:
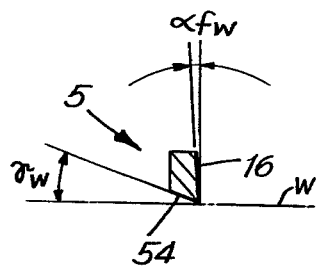
FIG. 9 is a transversal section of the cutter, taken in FIG. 5 along line IX — IX.

As can be seen in FIG. 6, the latter flank cutting edge 18 may also define an angle $\lambda_w$ with respect to the tool reference plane W, but it has been found better to have the edge 18 located directly in the reference plane.

The receiving grooves 4 in the carrier body 2 are stepped in the radial direction and include supporting surfaces 41, 42, as well as bearing or locating surfaces 43, 44, as shown in FIG. 2, for carrying the cutters 5, 6 in their respective positions.

In the operating direction of the milling cutter head 1, the surfaces 41, 42 preferably define a tilt or inclination angle $\lambda_s$ with reference to the milling-cutter head axis M, to allow the cutting edges to be readily set up (see FIG. 4).

The locating surfaces 43, 44 are offset by an acute angle with respect to the tangent T to the trajectory of the cutting points S of either the head cutting or the flank cutting edges 17, 18 so as to allow a radial clearance angle $\alpha_{fr}$ to become effective at the head cutting edge 17 with regard to the adjoining limiting surface 52.

It should again be mentioned that the contemplated partial overlap between the edges 17 of the adjoining cutters 5 and 6 in each pair is shown in FIG. 3. The active track circles of the outer and inner cutters 5, 6 are respectively identified by $\rho_{sa}$ and $\rho_{si}$.

As a practical expedient the invention also provides clamping screws 31, 32 and clamping blocks 33, 34 (see FIG. 2) with which the cutters 5, 6 can be inserted, fixed and immobilized in the carrier body 2. Upon the application of these elements in the receiving grooves 4, the milling operation can be started.

It is particularly advantageous in the inventive milling cutter head that a greater number of cutter pairs 5, 6 can be accommodated on a body 2 than ever before, in part due to the radially offset arrangement, as was explained before, in respect of certain inner surfaces of the grooves 4.

The following important features of the inventive milling cutter head can be summarized. The head comprises a substantially disk-shaped carrier body with a locking ring surrounding the same, these being the parts 2 and 3 shown in the drawings. The body has at least one pair of the grooves 4, of a stepped cross-section, for a corresponding number of pairs of removably inserted, substantially axially extending outer and inner milling cutter 5 and 6, respectively. It is important that the grooves 4 have different distances from the main axis M of the cutter head.

The cutters have head cutting edges 17 in head regions thereof, that partially overlap between the adjoining cutters of a pair, and corresponding flank cutting edges 18. Both cutters 5, 6 have cylindrical body surfaces 51 . . . 54 and 61 . . . 64 that are substantially rectilinear along the entire cutter lengths. These body surfaces include the chip bearing surfaces 54, 64 and the associated limiting surfaces 53, 62, which latter adjoin the flank cutting edges.

It is most important that the inclination angle defined between the chip bearing and the limiting surfaces is smaller than 90°. In fact, at least one of the chip bearing surfaces (54, 64) is substantially planar along the entire cutter length, and constitutes a main acting cutting surface from the outer end of the respective cutter (5 or 6) to its cutting edge, within the range of the head and flank cutting edges 17 and 18.

According to yet another important feature of the invention, the outer and the inner milling cutters 5, 6 are in direct contact with the carrier body 2 in both radial and tangential directions, as can readily be seen from FIGS. 1, 2 and 4 of the drawings.

A greater chip removal and hence an increased productivity is achieved. This is more and more important since attempts are generally made to reduce the unit time needed per workpiece in respect of machine running times.

The arrangement of the milling cutters in pairs leaves sufficient room for chip removal, thereby further increasing tool life, and improving machine performance. The invention retains the expedient of re-sharpening in the direction of the cutter axis, which greatly simplifies these procedures and reduces costs. As it was explained before, several (usually three or four) surfaces had to be re-sharpened, the inventive cutters require such work to be performed merely on the flank and the head clearance surfaces. The geometric requirements can be easily fulfilled when re-sharpening the milling cutters of this invention.

The technology of sharpening two remaining surfaces is much simpler than those used so far, a detail which has a decidedly favorable effect on the obtained gears and other produced articles.

Less material has to be removed when sharpening, which results in further material savings. It has been established with actual shop tests that only about one-third of the costly tool material is lost, as compared to the hitherto applied re-sharpening processes on four surfaces, not to mention the unavoidable subsequent adjustments which can be dispensed with according to the invention.

Both the head and the cutters themselves can be dimensioned much smaller, while maintaining the same safety and performance values, because less space is required for the inventive pairs of cutters while they even provide positive cutting angles in the milling process.

It should be understood, of course, that the foregoing disclosure relates to only to a preferred embodiment of the invention, and that it is intended to cover all changes, modifications and possible additions of the described example which do not constitute departures from the spirit and scope of the invention.

What we claim is:

1. A milling cutter head for making arcuate toothing, the head having a main axis (M), comprising a substantially disk-shaped carrier body (2) with a locking ring (3) surrounding the same; said body having therein at least one pair of grooves (4) of a stepped cross-section, for a corresponding number of pairs of removably inserted, substantially axially extending outer (5) and inner (6) milling cutters, said grooves having different distances from the main axis; said cutters having head cutting edges (17) in head regions thereof, that partially overlap between adjoining cutters of a pair, and corresponding flank cutting edges (18); wherein said cutters both have cylindrical body surfaces (51 . . . 54, 61 . . . 64) that are substantially rectilinear along the entire cutting lengths; said body surfaces including chip bearing surfaces (54, 64) and associated limiting surfaces (53, 62), which latter adjoin said flank cutting edges; wherein the inclination angle ($\Psi$) defined between said chip bearing and said limiting surfaces is smaller than 90°; and wherein at least one of said chip bearing surfaces is substantially planar along said entire cutter length and constitutes a main active cutting surface from the outer end of the respective cutter to its cutting edge.

2. The milling cutter head as defined in claim 1, wherein said milling cutters (5, 6) are rod-shaped and have substantially quandrilateral cross-sections.

3. The milling cutter head as defined in claim 1, wherein said stepped configuration includes supporting surfaces (41, 42) and locating surfaces (43, 44) in said receiving grooves (4) for said milling cutters (5, 6).

4. The milling cutter head as defined in claim 1, wherein said receiving grooves (4) have therein supporting surfaces (41, 42) for said milling cutters (5, 6), which surfaces are displaced by a tilt angle ($\lambda_s$) with respect to the milling-cutter head axis (M) in the operating direction of the milling cutter head.

5. The milling cutter head as defined in claim 1, wherein said receiving grooves (4) have therein locating surfaces (43, 44) for said milling cutters (5, 6), which surfaces are offset by a radial clearance angle ($\alpha_{fr}$) with respect to a tangent (T) to the trajectory of the cutting points (S) of at least one of said head cutting (17) and said flank cutting (18) edges.

6. The milling cutter head as defined in claim 1, wherein said milling cutters (5, 6) both have head clearance surfaces (15) and flank clearance surfaces (16), said head cutting (17) and said flank cutting (18) edges being formed at the points of intersection of said clearance surfaces (15,16) with said chip bearing surfaces (54, 64).

7. The milling cutter head as defined in claim 1, wherein said milling cutters (5, 6) are in direct contact with said carrier body (2) in both radial and tangential directions.

* * * * *

UNITED STATES PATENT OFFICE
CERTIFICATE OF CORRECTION

Patent No. 4,093,391  Dated  June 6, 1978

Inventor(s)  Lothar Willy Bachmann et al

It is certified that error appears in the above-identified patent and that said Letters Patent are hereby corrected as shown below:

In the Abstract, 10th line thereof (line 8 in the 2nd column), change "of" to -- to --; line 18 (line 16 in the 2nd column), cancel "are";

Column 6, line 39, correct the spelling of "quadrilateral"; and in column 3 of the description, line 10, cancel "have".

Signed and Sealed this

Fourteenth Day of November 1978

[SEAL]

Attest:

RUTH C. MASON
Attesting Officer

DONALD W. BANNER
Commissioner of Patents and Trademarks